(12) United States Patent
Yanase et al.

(10) Patent No.: US 9,278,398 B2
(45) Date of Patent: Mar. 8, 2016

(54) METHOD FOR MACHINING INTERNALLY TOOTHED GEAR AND METHOD FOR DRESSING TOOL USED FOR SAME

(75) Inventors: Yoshikoto Yanase, Tokyo (JP); Masashi Ochi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 877 days.

(21) Appl. No.: 13/387,260

(22) PCT Filed: Jul. 15, 2010

(86) PCT No.: PCT/JP2010/061936
§ 371 (c)(1),
(2), (4) Date: Apr. 3, 2012

(87) PCT Pub. No.: WO2011/013516
PCT Pub. Date: Feb. 3, 2011

(65) Prior Publication Data
US 2012/0184187 A1    Jul. 19, 2012

(30) Foreign Application Priority Data
Jul. 27, 2009    (JP) ................................. 2009-173822

(51) Int. Cl.
*B23F 5/04*    (2006.01)
*B24B 53/075*    (2006.01)
(Continued)

(52) U.S. Cl.
CPC ............... *B23F 23/1225* (2013.01); *B23F 5/04* (2013.01); *B24B 53/085* (2013.01)

(58) Field of Classification Search
CPC ...... B23F 5/04; B23F 23/1225; B24B 53/085
USPC .............................................. 451/47, 900, 56
See application file for complete search history.

(56) References Cited

U.S. PATENT DOCUMENTS 2,228,967 A * 1/1941 Miller .............................. 76/115
2,893,173 A * 7/1959 Bateman ........................ 451/219
(Continued)

FOREIGN PATENT DOCUMENTS

DE            4207511 A1 *  9/1993
DE        10131060 A1 *  1/2003
(Continued)

OTHER PUBLICATIONS

Office Action issued Aug. 16, 2013 for related Chinese Application No. 201080032296.5 with an English translation.
(Continued)

*Primary Examiner* — Lee D Wilson
*Assistant Examiner* — Joel Crandall
(74) *Attorney, Agent, or Firm* — Birch, Stewart, Kolasch & Birch, LLP

(57) ABSTRACT

A method is disclosed for dressing a tool used for machining an internally toothed gear. The method includes meshing an internally toothed gear-like dressing gear, which is rotatable about the dressing gear rotation axis, with a barrel-shaped, screw-like grindstone. For machining an internally toothed gear, the outer diameter of the screw-like grindstone after dressing is estimated before dressing, the angle of intersection between a dressing gear rotation axis and the screw-like tool rotation axis is set on the basis of the estimated outer diameter of the screw-like grindstone after dressing, and dressing is performed with the dressing gear and the screw-like grindstone meshed with each other at the set angle of intersection between the axes.

2 Claims, 6 Drawing Sheets

(51) Int. Cl.
  *B23F 23/12* (2006.01)
  *B24B 53/085* (2006.01)

(56) References Cited

U.S. PATENT DOCUMENTS

| | | | | |
|---|---|---|---|---|
| 3,602,209 | A | * | 8/1971 | Bocker ................. 125/11.03 |
| 3,813,821 | A | * | 6/1974 | Takahashi et al. ........... 451/47 |
| 3,916,569 | A | * | 11/1975 | Wydler et al. ................ 451/5 |
| 4,077,164 | A | * | 3/1978 | Peterman, Jr. ............. 451/547 |
| 4,650,378 | A | * | 3/1987 | Zubler ...................... 409/12 |
| 5,076,020 | A | * | 12/1991 | Negri ........................ 451/21 |
| 5,175,962 | A | * | 1/1993 | Pedersen ..................... 451/5 |
| 5,289,815 | A | * | 3/1994 | Krenzer .................. 125/11.03 |
| 5,347,760 | A | * | 9/1994 | Miyauch et al. ........... 451/114 |
| 5,954,568 | A | * | 9/1999 | Wirz .......................... 451/47 |
| 6,217,409 | B1 | * | 4/2001 | Stadtfeld et al. .............. 451/5 |
| 6,602,115 | B2 | * | 8/2003 | Tan ............................ 451/47 |
| 6,805,620 | B2 | * | 10/2004 | Iwai et al. ................... 451/219 |
| 6,942,555 | B2 | * | 9/2005 | Hayashi et al. ............. 451/253 |
| 8,460,064 | B2 | * | 6/2013 | Yanase et al. ................ 451/56 |
| 2002/0019195 | A1 | * | 2/2002 | Asano et al. .................. 451/8 |
| 2002/0119737 | A1 | * | 8/2002 | Tan ............................ 451/47 |
| 2007/0202774 | A1 | * | 8/2007 | Yanase et al. .................. 451/5 |
| 2007/0275640 | A1 | * | 11/2007 | Iwano ......................... 451/47 |
| 2010/0272534 | A1 | | 10/2010 | Yanase et al. |

FOREIGN PATENT DOCUMENTS

| | | | | |
|---|---|---|---|---|
| FR | 879289 | A | * | 2/1943 |
| FR | 2070927 | A5 | * | 9/1971 |
| JP | 8-252768 | A | | 10/1996 |
| JP | 11-138346 | A | | 5/1999 |
| JP | 3366772 | B2 | | 1/2003 |
| JP | 2003-39321 | A | | 2/2003 |
| JP | 2009-45681 | A | | 3/2009 |
| JP | 2009-142939 | A | | 7/2009 |
| TW | 200924906 | A1 | | 6/2009 |
| WO | WO 2009/025198 | A1 | | 2/2009 |
| WO | WO 2009025198 | A1 | * | 2/2009 |
| WO | WO 2009078193 | A1 | * | 6/2009 |

OTHER PUBLICATIONS

Korean Notice of Allowance dated Mar. 18, 2014 for Korean Application No. 10-2012-7002012 with English translation.

* cited by examiner

| | 1 | 2 | 3 | 4 | 5 | 6 |
|---|---|---|---|---|---|---|
| Grindstone outer diameter (mm) (central portion) | 75.6 | 75.4 | 75.2 | 75 | 74.8 | 74.6 |
| Grindstone pitch diameter (mm) (central portion) | 71.6 | 71.4 | 71.2 | 71.0 | 70.8 | 70.6 |
| Grindstone helix angle (deg) (central portion) | 50.0 | 49.9 | 49.8 | 49.6 | 49.5 | 49.3 |
| Center-to-center distance (mm) between work and grindstone | 28.1 | 28.2 | 28.3 | 28.4 | 28.5 | 28.6 |
| Slip velocity (m/s) | 28.6 | 28.6 | 28.6 | 28.6 | 28.6 | 28.6 |
| Number of work rotations (min$^{-1}$) | 5500 | 5538 | 5577 | 5616 | 5656 | 5696 |
| Number of grindstone rotations (min$^{-1}$) | 14348 | 14447 | 14549 | 14650 | 14755 | 14859 |
| Axis angle (deg) | 30.0 | 29.9 | 29.8 | 29.6 | 29.5 | 29.3 |

| | 1 | 2 | 3 | 4 | 5 | 6 |
|---|---|---|---|---|---|---|
| Grindstone outer diameter (mm) (central portion) | 55 | 54.8 | 54.6 | 54.4 | 54.2 | 54 |
| Grindstone pitch diameter (mm) (central portion) | 52.6 | 52.4 | 52.2 | 52.0 | 51.8 | 51.6 |
| Grindstone helix angle (deg) (central portion) | 45.0 | 44.8 | 44.5 | 44.3 | 44.1 | 43.9 |
| Center-to-center distance (mm) between work and grindstone | 31.2 | 31.3 | 31.4 | 31.5 | 31.6 | 31.7 |
| Slip velocity (m/s) | 19.8 | 19.8 | 19.8 | 19.8 | 19.8 | 19.8 |
| Number of work rotations (min$^{-1}$) | 5500 | 5566 | 5635 | 5710 | 5780 | 5850 |
| Number of grindstone rotations (min$^{-1}$) | 15968 | 16159 | 16360 | 16577 | 16781 | 16984 |
| Axis angle (deg) | 25.0 | 24.8 | 24.5 | 24.3 | 24.1 | 23.9 |

METHOD FOR MACHINING INTERNALLY TOOTHED GEAR AND METHOD FOR DRESSING TOOL USED FOR SAME

TECHNICAL FIELD

This invention relates to an internal gear machining method for grinding the tooth flanks of an internal gear, as a workpiece, with the use of a barrel-shaped screw-like tool, and a method for dressing the barrel-shaped screw-like tool.

BACKGROUND ART

Gears are in frequent use in transmissions, etc. for automobiles. In recent years, a further improvement in the machining accuracy of the gears has been desired with the aim of reducing vibrations and noise of the transmissions. With the gear machining method, it is common practice to carry out gear cutting in a predetermined gear material, thereby forming a gear, heat-treat the gear formed by gear cutting, and then perform finishing (grinding) in order to remove strain or the like due to this heat treatment. So far, the gear to be machined after heat treatment and a grindstone have been put in mesh, with an angle of axis intersection being given, and their grinding has been carried out. Tools used for these grinding processes are available in shapes, such as an external gear shape, an internal gear shape, and a screw (worm) shape, in accordance with the shape of the gear to be ground.

The sharpness of the grindstone decreases as the grindstone wears with the progress of grinding. After a predetermined number of gears are ground, therefore, it becomes necessary to dress the grindstone having a worn-out grinding surface, thereby regenerating a sharp cutting edge surface.

As a method for dressing, it is performed to dress the grindstone with the use of a dressing gear set to have nearly the same gear specifications as those of the finished gear. During dressing, it is general practice to liken the dressing gear to the gear to be machined, set the angle of intersection of the axes of the dressing gear and the grindstone at the angle of axis intersection during grinding of the gear to be machined, and carry out dressing at this angle. Patent Document 1, on the other hand, discloses a hard gear honing method related to grinding of an externally toothed work (external gear to be machined) with respect to an internally toothed grindstone, with a crossed axes angle (angle of axis intersection) between an externally toothed dressing gear and the internally toothed grindstone being gradually decreased each time dressing is performed, in order to increase the number of dressings becoming possible, and lengthen the life of the grindstone.

PRIOR ART DOCUMENTS
Patent Documents
Patent Document 1: JP-A-11-138346 (see, for example, the paragraphs [0011] to [0020])

SUMMARY OF THE INVENTION

Problems to be Solved by the Invention

In recent years, a further increase in the machining accuracy of an internal gear as well as an external gear has been desired. There is a method which comprises finish machining an internal gear to be machined, with the gear in mesh with a screw-like grindstone as a grindstone for grinding the gear. A common method for dressing the screw-like grindstone with the use of a dressing gear, without change in the angle of axis intersection for each dressing, has posed the following problems: The influence of a change in the diameter of the screw-like grindstone, the diameter decreasing with each dressing, extends to the shape of the cutting edge surface of the screw-like grindstone. As a result, the state of contact between the screw-like grindstone after dressing and the internal gear to be machined changes compared with that for the screw-like grindstone before dressing. This change has been likely to exert not a little influence on grinding, thus changing the tooth flank shape of the machined internal gear after grinding. With large-scale machining, in particular, the change affects the stabilization of the machining accuracy.

The present invention has been accomplished, therefore, in an attempt to solve the above-described problems. It is an object of the invention to provide an internal gear machining method, which can stabilize the machining accuracy of an internal gear to be machined, even using a tool after regeneration of the grinding surface of its grindstone; and a method for dressing the tool used in the internal gear machining method.

Means for Solving the Problems

An internal gear machining method according to a first aspect of the present invention for solving the above-mentioned problems is an internal gear machining method for engaging an internal gear to be machined, which is rotatable about a work rotation axis, with a barrel-shaped screw-like tool, which is rotatable about a tool rotation axis disposed at a predetermined angle of axis intersection with respect to the work rotation axis, and synchronously rotating the internal gear to be machined and the screw-like tool in engagement with each other, thereby performing grinding of the internal gear to be machined, wherein the angle of axis intersection for the grinding is set based on an outer diameter of the screw-like tool after dressing, the outer diameter of the screw-like tool after dressing being predicted before the dressing of the screw-like tool, the screw-like tool is dressed based on the set angle of axis intersection, and the dressed screw-like tool is disposed at the set angle of axis intersection.

An internal gear machining method according to a second aspect of the present invention for solving the above-mentioned problems is the internal gear machining method according to the first aspect of the invention, wherein the angle of axis intersection is set to be gradually decreased each time the screw-like tool is dressed.

An internal gear machining method according to a third aspect of the present invention for solving the above-mentioned problems is the internal gear machining method according to the first aspect of the invention, wherein a slip velocity during grinding before dressing is computed, and the number of rotations of the internal gear to be machined and the number of rotations of the screw-like tool are set based on the computed slip velocity.

A screw-like tool dressing method according to a fourth aspect of the present invention for solving the above-mentioned problems is a screw-like tool dressing method for performing dressing of a barrel-shaped screw-like tool by use of a dressing tool, the screw-like tool being formed to have a diameter gradually increasing from axially opposite ends thereof toward an axially intermediate portion thereof, and the screw-like tool being used for machining an internal gear to be machined, wherein an outer diameter of the screw-like tool after dressing is predicted before dressing, an angle of axis intersection for grinding after dressing is set based on the predicted outer diameter of the screw-like tool after dressing, a helix angle of the screw-like tool is set based on the set angle of axis intersection, and dressing is performed using the dressing tool such that the screw-like tool has the set helix angle.

A screw-like tool dressing method according to a fifth aspect of the present invention for solving the above-mentioned problems is the screw-like tool dressing method according to the fourth aspect of the invention, wherein the dressing tool is an internally toothed dressing gear rotatable about a dressing gear rotation axis, and dressing is performed, with the dressing gear and the screw-like tool being engaged with each other at the set angle of axis intersection.

A screw-like tool dressing method according to a sixth aspect of the present invention for solving the above-mentioned problems is the screw-like tool dressing method according to the fourth aspect of the invention, wherein the dressing tool is a dresser of a shape having, as contours thereof, a sectional shape of a tooth of the internal gear to be machined, and dressing is performed, with the dresser being engaged with the screw-like tool at the set helix angle.

Effects of the Invention

According to the internal gear machining method concerned with the present invention, the angle of axis intersection and the helix angle of the screw-like tool during grinding are set based on the outer diameter of the screw-like tool after dressing, as described above. By so doing, the state of contact between the screw-like tool and the internal gear to be machined can be rendered always identical, without differences between the state before and the state after dressing of the screw-like tool. Thus, the same state of grinding as that before dressing can be ensured even after dressing. Consequently, the shape of the tooth flank of the internal gear to be machined changes minimally between machining before dressing and machining after dressing, and the machining accuracy can be stabilized.

According to the screw-like tool dressing method concerned with the present invention, there can be prepared a screw-like grindstone which, even when its outer diameter is decreased by dressing of the screw-like tool as described above, can render the state of contact with the internal gear to be machined during grinding identical with that of the screw-like grindstone before dressing. That is, the same state of grinding as that before dressing can be ensured even after dressing. Thus, it is possible to prepare a screw-like tool by which the shape of the tooth flank of the internal gear to be machined changes minimally between machining before dressing and machining after dressing, and the machining accuracy can be stabilized.

BRIEF DESCRIPTION OF THE DRAWINGS

[FIGS. 5(a) and 5(b)] are views showing the results of analysis of a simulation (1), in which FIG. 5(a) is a table showing the grindstone helix angle, the number of work rotations ($min^{-1}$), the number of grindstone rotations ($min^{-1}$), and the slip velocity (m/s) with respect to the grindstone specifications, and FIG. 5(b) is a view showing the relation between the grindstone outer diameter and the axis angle.

FIGS. 6(a) and 6(b) are views showing the results of analysis of a simulation (2), in which FIG. 6(a) is a table showing the grindstone helix angle, the number of work rotations ($min^{-1}$), the number of grindstone rotations ($min^{-1}$), and the slip velocity (m/s) with respect to the grindstone specifications, and FIG. 6(b) is a view showing the relation between the grindstone outer diameter and the axis angle.

MODE FOR CARRYING OUT THE INVENTION

Main Embodiment

An embodiment of an internal gear machining method according to the present invention, and a method for dressing a tool used for the internal gear machining method will be described concretely with reference to FIG. 1 to FIGS. 6(a), 6(b).

Figure 1:
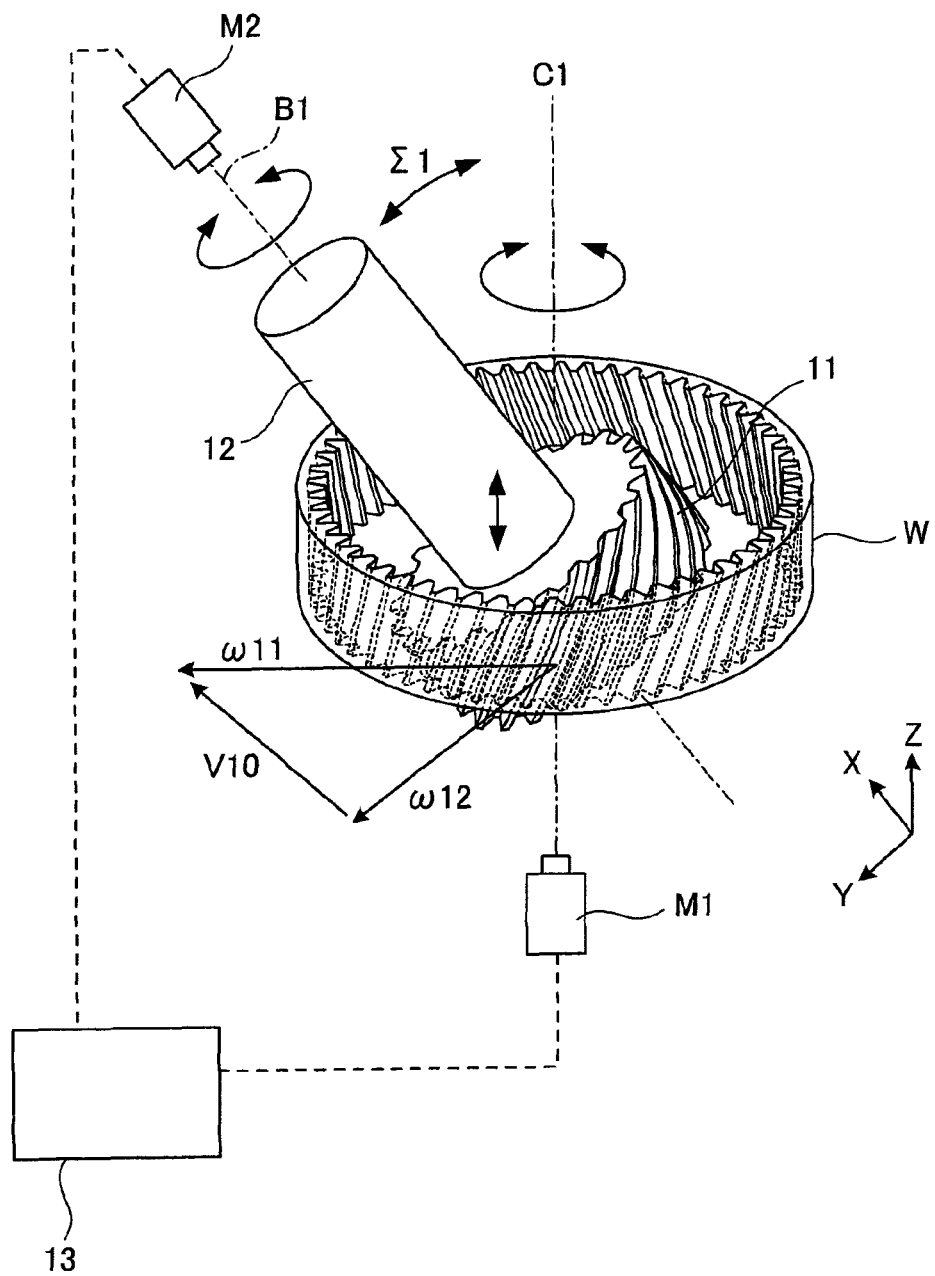
FIG. 1 is a view showing an embodiment of an internal gear machining method according to the present invention.
Figure 3:
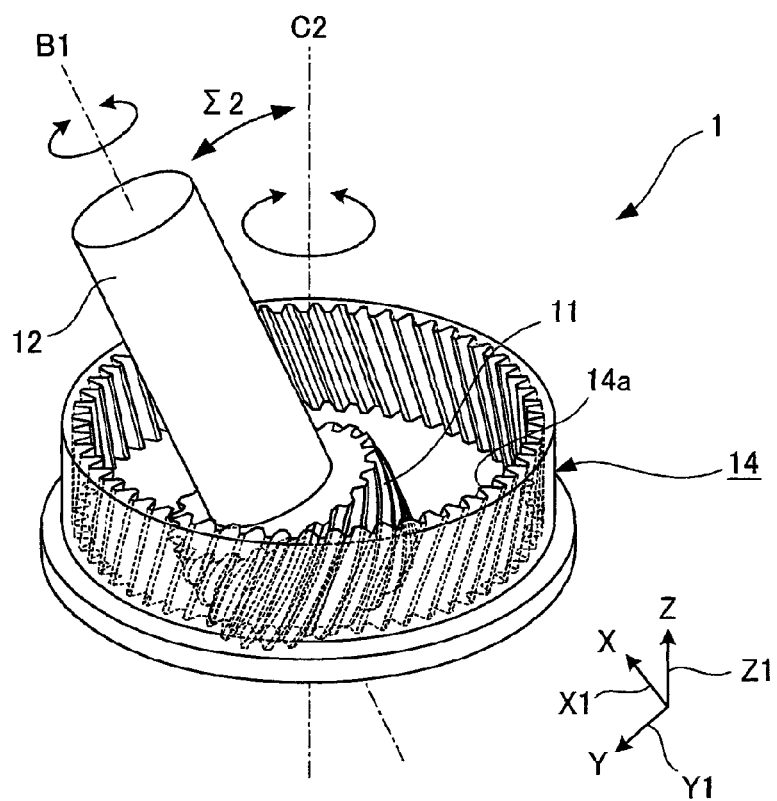
FIG. 3 is a view showing the state of arrangement of the screw-like grindstone and a dressing gear in a dressing apparatus.

A gear grinding machine (not shown) adopting the internal gear machining method according to the present embodiment grinds the tooth flanks of a work W, which is an internal gear to be machined, by a screw-like grindstone (screw-like tool) 11, as shown in FIG. 1. Further, as shown in FIG. 3, the gear grinding machine is a machine capable of dressing the screw-like grindstone 11 with a dressing gear 14, which is a dressing tool, with the use of a dressing apparatus 1 annexed to the internal gear grinding machine.

The work W is mounted on the gear grinding machine in such a manner as to be rotatable about a vertical (Z-axis direction) work rotation axis C1 by a work rotational drive source M1.

A grindstone arbor 12, which is mounted on a grindstone main spindle (not shown), is supported on the gear grinding machine in such a manner as to be rotatable about a grindstone rotation axis B1 by a grindstone rotational drive source M2. The grindstone arbor 12 is also supported on the gear grinding machine in such a manner as to be movable in a direction in which the distance between the work rotation axis C1 and the grindstone rotation axis B1 is adjusted (hereinafter referred to as the X-axis direction), in a direction which is perpendicular to the X-axis direction and which is further perpendicular to the grindstone rotation axis B1 (hereinafter referred to as the Y-axis direction), and in the Z-axis direction. The screw-like grindstone 11 for grinding the work W is mounted at the leading end of the grindstone arbor 12. Thus, the grindstone arbor 12 is moved in the X-axis, Y-axis and Z-axis directions and rotated about the grindstone rotation axis B1, whereby the screw-like grindstone 11 is moved and rotated together with the grindstone arbor 12.

Furthermore, the grindstone arbor 12 is supported such that it can be swiveled about a grindstone swivel axis (not shown) extending in the X-axis direction. Thus, the grindstone arbor 12 is swiveled about the grindstone swivel axis to change the swivel angle of the grindstone rotation axis B1, whereby the angle of axis intersection (hereinafter referred to as the axis angle Σ) between the grindstone rotation axis B1 and the work rotation axis C1 can be adjusted. That is, the screw-like grindstone 11 during grinding is rotated about the grindstone rotation axis B1 which intersects the work rotation axis C1 of the work W at the axis angle Σ.

Figure 2:
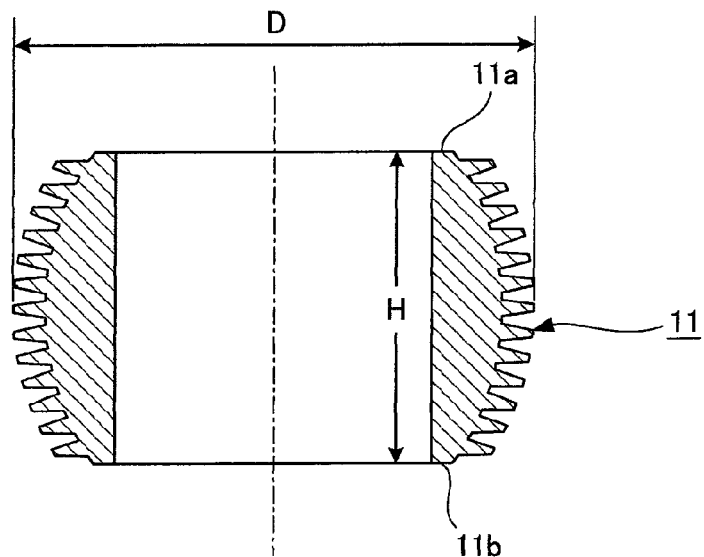
FIG. 2 is a longitudinal sectional view of a screw-like grindstone.

As shown in FIG. 2, the screw-like grindstone 11 is formed in the shape of a barrel which has a diametrical dimension gradually decreasing from an axially intermediate portion (central portion) thereof toward axially opposite ends 11a, 11B thereof in the direction of the grindstone width (the axial length of the grindstone) H thereof. By so forming the screw-like grindstone 11 in the barrel shape, it becomes possible to carry out machining, without the interference of the axially opposite ends of the screw-like grindstone 11 with the work, even if the screw-like grindstone 11, in other words, the grindstone rotation axis B1, is disposed obliquely at the axis angle Σ with respect to the work rotation axis C1. Furthermore, the magnitude of the outer diameter (dimension) in the intermediate portion of the screw-like grindstone 11 is D, and the screw-like grindstone 11 is given grindstone specifications which ensure appropriate engagement with the work having work specifications. The axis angle Σ is determined by the work helix angle and the grindstone helix angle in the axially intermediate portion of the screw-like grindstone (hereinafter referred to as the grindstone reference helix angle) as [(grindstone reference helix angle)−(work helix angle)] or [(grindstone reference helix angle)+(work helix angle)].

As shown in FIG. 1, therefore, when the work W is to be ground with the screw-like grindstone 11, the screw-like grindstone 11 is first disposed at a predetermined swivel angle under a command from a control device 13 such that a predetermined axis angle Σ1 is achieved. Then, the screw-like grindstone 11 disposed at the axis angle Σ1 is moved inwardly of the work W, and is further moved into engagement with the work W. In such a state of engagement, the work W is rotated about the work rotation axis C1, and the screw-like grindstone 11 is swung vertically (in the Z-axis direction) while being rotated about the grindstone rotation axis B1. By this procedure, the tooth flanks of the work W are ground by the cutting edge surfaces of the screw-like grindstone 11.

At the time of the above grinding, the screw-like grindstone 11 is rotated about the grindstone rotation axis B1 which intersects the work rotation axis C1 at the axis angle Σ1. Thus, a slip velocity V10 occurs between the screw-like grindstone 11 and the work W. The slip velocity V10 is the relative velocity of the work angular velocity coil of the work W (peripheral speed of the work W) relative to the grindstone angular velocity ω12 of the screw-like grindstone 11 (peripheral speed of the screw-like grindstone 11) at the point of contact between the cutting edge surface of the screw-like grindstone 11 and the tooth flank of the work W (the relative velocity may be the relative velocity of the grindstone angular velocity ω12 of the screw-like grindstone 11 relative to the work angular velocity ω11 of the work W). By so producing the slip velocity V10 between the screw-like grindstone 11 and the work W by the engaging rotation and the axis angle Σ1, the tooth flanks of the work W are ground.

Upon grinding of a predetermined number of the works W with the use of the screw-like grindstone 11, the cutting edge surfaces (grinding surfaces) of the screw-like grindstone 11 wear and their sharpness declines. Thus, the dressing apparatus 1 is periodically driven to dress the screw-like grindstone 11.

The dressing gear 14, which the dressing apparatus 1 includes, has practically the same specifications as those of the work W. As shown in FIG. 3, a plurality of tooth flanks 14a are formed at a predetermined pitch on the inside of the dressing gear 14. The tooth flanks 14a, which make engaging contact with the cutting edge surfaces of the screw-like grindstone 11, are electroplated (coated) with diamond abrasive grains.

When the screw-like grindstone 11 is to be dressed using the dressing gear 14, the dressing gear 14 is disposed at the work mounting position instead of the work, as shown in FIG. 3. On the other hand, the screw-like grindstone 11 is disposed at a predetermined swivel angle so that the grindstone rotation axis B1 forms a predetermined axis angle Σ2 with a dressing gear rotation axis C2. The axis angle Σ2 is set by predicting or estimating the outer diameter of the screw-like grindstone 11, which will be obtained after dressing, and performing computations in accordance with the predicted value of the outer diameter. The prediction of the outer diameter of the screw-like grindstone 11 after dressing can be made by calculating how much the dressing gear 14 cuts into the screw-like grindstone 11 during dressing, for example, based on the distance between the centers of the screw-like grindstone 11 and the dressing gear 14.

Then, the screw-like grindstone 11 disposed at the axis angle Σ2 is moved inwardly of the dressing gear 14 along an axis X1 in the X-axis direction, along an axis Y1 in the Y-axis direction, and along an axis Z1 in the Z-axis direction. Then, the screw-like grindstone 11 is further moved into engagement with the dressing gear 14. In such a state of engagement, the dressing gear 14 is rotated about the dressing gear rotation axis C2, and the screw-like grindstone 11 is swung vertically (in the Z-axis direction) while being rotated about the grindstone rotation axis B1. By this procedure, the cutting edge surfaces of the screw-like grindstone 11 are dressed with the tooth flanks 14a of the dressing gear 14 to regenerate the cutting edge surfaces (grinding surfaces) of the screw-like grindstone 11.

The above-mentioned axis angle, which is set based on the magnitude of the outer diameter of the screw-like grindstone 11 after dressing, is obtained using the following arithmetic expression (1):

[Equation 1]

$$W = \pi \times Mn \times z \times [\tan(\Sigma + \beta) \times \tan(\beta)] \times N1 \quad (1)$$

In the above arithmetic expression (1), W denotes the slip velocity (grinding speed), Mn denotes the module, z denotes the number of teeth, Σ denotes the axis angle (deg), β denotes the work helix angle (deg), and N1 denotes the number of work rotations ($min^{-1}$).

Figure 4:
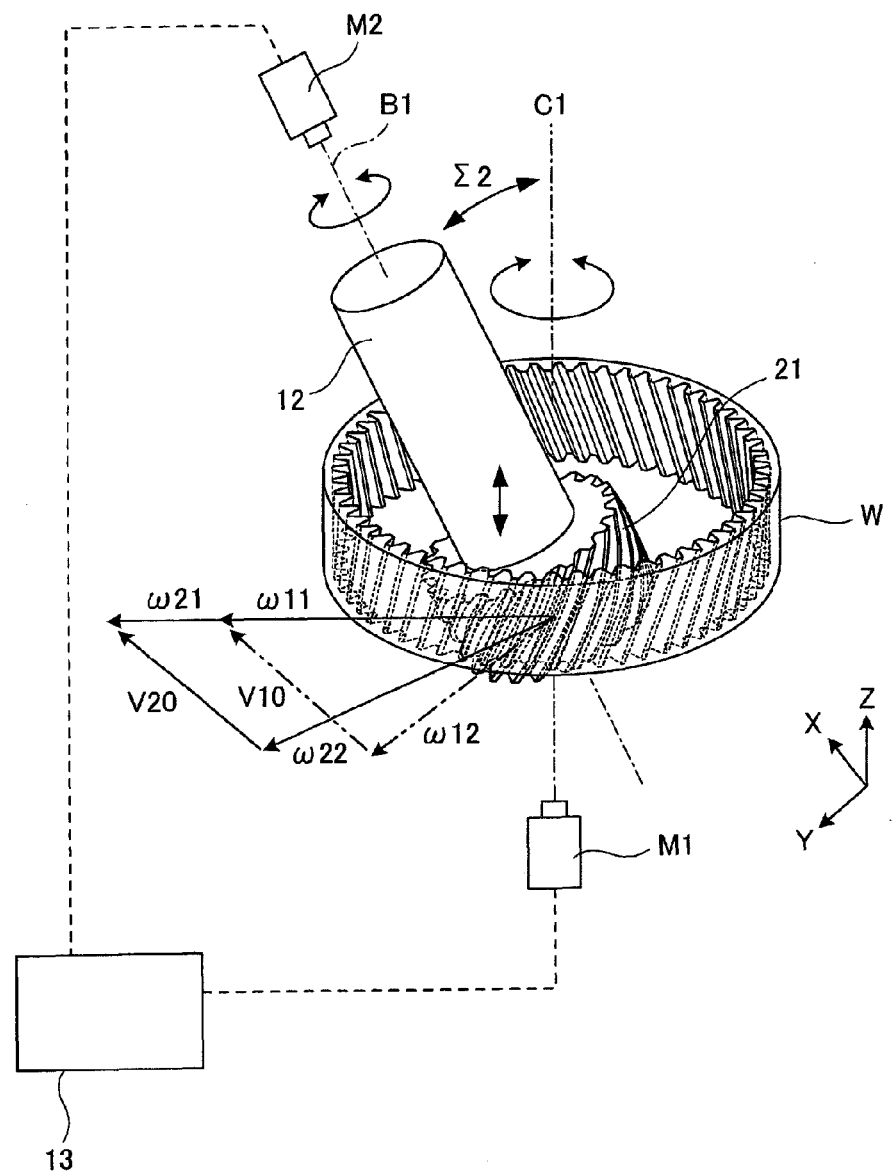
FIG. 4 is an explanation drawing of the embodiment of the internal gear machining method according to the present invention.

In order to render the state of contact between a screw-like grindstone 21 after dressing and the work W the same as the state of contact between the screw-like grindstone 11 before dressing and the work W, a desired axis angle during grinding in accordance with the outer diameter of the screw-like grindstone 21 is obtained, and the helix angle of the screw-like grindstone 11 conformed to this axis angle is obtained, because the outer diameter of the screw-like grindstone 21 becomes smaller upon dressing of the screw-like grindstone 11. For this purpose, dressing of the screw-like grindstone 11 is performed using the dressing gear at the axis angle Σ2 set to achieve the desired helix angle after dressing. After the dressing, the axis angle Σ in grinding is set in accordance with the helix angle of the screw-like grindstone 21, and grinding is carried out. It is also important not to change the slip velocity during grinding. In order that the same slip velocity as that before dressing is obtained even after dressing of the screw-like grindstone 11 based on the arithmetic expression (1), the number of work rotations during grinding, which is adaptable to a change in the axis angle, is set. Since the grindstone and the work make synchronous rotations, the number of grindstone rotations is also set in accordance with a change in the number of work rotations. That is, as shown in FIG. 4, when the work W is to be ground with the screw-like grindstone 21 after dressing, the screw-like grindstone 21 after dressing is disposed at the axis angle Σ2 which is smaller than the axis angle Σ1 at which the screw-like grindstone 11 before dressing is disposed. As a result, there is produced a slip velocity V20 which is the relative velocity of the work angular velocity ω21 of the work W (peripheral speed of the work W) relative to the grindstone angular velocity ω22 of the screw-like grindstone 21 (peripheral speed of the screw-like grindstone 21) at the point of contact between the cutting edge surface of the screw-like grindstone 21 and the tooth flank of the work W (the relative velocity may be the relative velocity of the grindstone angular velocity ω22 of the screw-like grindstone 21 relative to the work angular velocity ω21 of the work W). In this manner, the number or work rotations and the number of grindstone rotations responsive to the change in the axis angle are set, whereby the slip velocity V20 during grinding after dressing can be rendered identical with the slip velocity V10 before dressing.

According the internal gear machining method concerned with the present embodiment, therefore, the outer diameter of the screw-like grindstone 21 after dressing is predicted before dressing, the dressing gear is set such that the computed axis angle Σ2 is established, based on the predicted outer diameter of the screw-like grindstone 21. Under these conditions, dressing is carried out. When grinding of the work is to be performed after dressing, the axis angle (the same value as the axis angle Σ2 during dressing) between the screw-like grindstone and the work is set based on the outer diameter and helix angle of the screw-like grindstone 21 after dressing, whereafter the screw-like grindstone 21 is disposed. By so doing, the state of contact between the work W and the screw-like grindstone during grinding can be rendered always identical, without change, even though the screw-like grindstone has been dressed. Thus, the same state of grinding as that before dressing can be ensured even after dressing, and the shape of the tooth flank of the work W changes minimally between machining before dressing and machining after dressing. Consequently, it becomes possible to prepare a screw-like grindstone which can stabilize machining accuracy.

Next, the method of setting the axis angle Σ based on the magnitude of the outer diameter of the screw-like grindstone 11, intended for stabilization of the machining accuracy after dressing, will be described concretely using FIGS. 5(a), 5(b) and 6(a), 6(b).

To elucidate the relation between the axis angle Σ and the magnitude of the outer diameter of the screw-like grindstone 11, analyses were made in simulations (1) and (2) to be described below. In these simulations (1), (2), it was assumed that the outer diameter of the grindstone would-be changed by dressing, and the analyses were made under this assumption.

First of all, the simulation (1) will be described using FIGS. 5(a), 5(b).

In the simulation (1), dressing gear specifications and grindstone specifications were set as shown in (D1) and (T1) below.

(D1) Dressing Gear Specifications
Module: 2.0
Number of teeth: 60
Pressure angle: 20°
Helix angle: 20°
Tooth bottom diameter: 131.7 mm
Tooth top diameter: 123.7 mm
Tooth width: 30 mm
(T1) Grindstone Specifications
Number of teeth: 23
Grindstone outer diameter (central portion): 75.6 mm (initial)
Grindstone pitch diameter (outer diameter): 71.6 mm (initial)
Grindstone width: 30 mm
Grindstone reference helix angle: 50.0° (initial)

As described above, the number of teeth, the grindstone outer diameter, the grindstone pitch diameter, the grindstone width, and the grindstone helix angle are set in the screw-like grindstone 11. In accordance with these settings, the number of grindstone rotations, the number of work rotations, and the axis angle Σ are set. Based on these parameters, the relation between the magnitude of the outer diameter (diameter) of the screw-like grindstone and the axis angle Σ, and the slip velocity during grinding can be obtained.

Figures 5A, 5B:
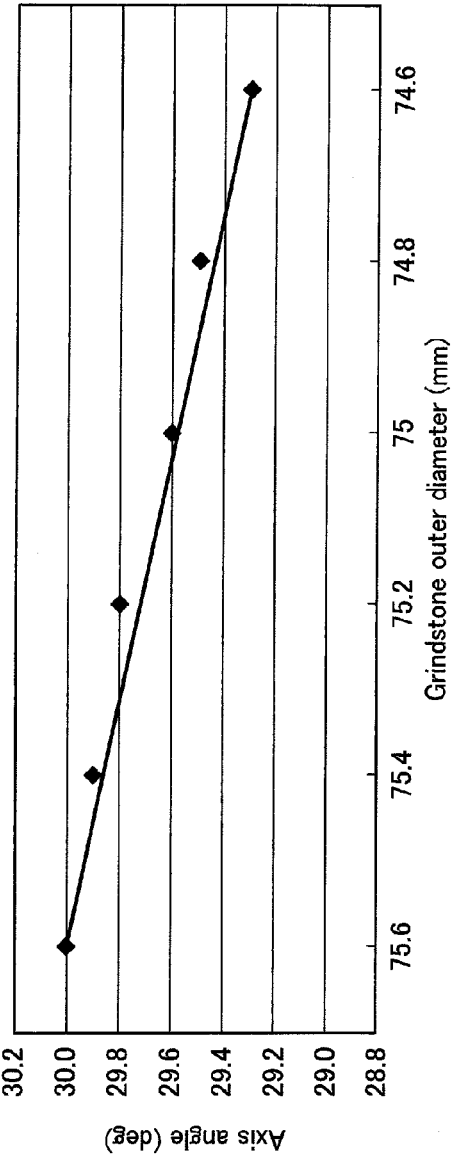

To investigate the respective conditions in response to changes in the outer diameter of the screw-like grindstone, some of the grindstone specifications and the axis angle Σ, the number of grindstone rotations, the number of work rotations, the slip velocity, and the center-to-center distance between the work and the grindstone in association therewith are tabulated, as shown in FIG. 5(a). Also, the relation between the axis angle Σ and the outer diameter of the grindstone has been elucidated, as shown in FIG. 5(b).

As shown in FIGS. 5(a), 5(b), in consideration of the state of contact between the screw-like grindstone and the work, as the outer diameter of the screw-like grindstone is decreased by dressing, the axis angle Σ and the helix angle of the screw-like grindstone during grinding are rendered smaller. To obtain such a helix angle of the screw-like grindstone, it suffices to set the axis angle Σ during dressing at a smaller value, as the outer diameter of the grindstone is decreased. To render the slip velocity constant, on the other hand, it is advisable to set the number of work rotations and the number of grindstone rotations at larger values. That is, as the axis angle Σ set is decreased, the numbers of rotations of the work and the screw-like grindstone are increased. By this means, the slip velocity of the screw-like grindstone during grinding can be based on the slip velocity of the screw-like grindstone during grinding before dressing. That is, the slip velocity can be maintained constant, and even upon dressing, the grinding properties of the screw-like grindstone can be stabilized.

Then, the simulation (2) will be described using FIGS. 6(a), 6(b).

In the simulation (2), dressing gear specifications and grindstone specifications were set as shown in (D2) and (T2) below.

(D2) Dressing Gear Specifications
Module: 1.2
Number of teeth: 90
Pressure angle: 20°
Helix angle: 20°
Tooth bottom diameter: 117.3 mm
Tooth tcp diameter: 112.5 mm
Tooth width: 30 mm
(T2) Grindstone Specifications
Number of teeth: 31
Grindstone outer diameter (central portion):55 mm (initial)
Grindstone pitch diameter (outer diameter): 52.6 mm (initial)
Grindstone width: 30 mm
Grindstone reference helix angle: 45° (initial)

As described above, the number of teeth, the grindstone outer diameter, the grindstone pitch diameter, the grindstone width, and the grindstone helix angle are set in the screw-like grindstone 11. In accordance with these settings, the number of grindstone rotations, the number of work rotations, and the axis angle Σ are set. Based on these parameters, the relation between the magnitude of the outer diameter (diameter) of the screw-like grindstone and the axis angle Σ, and the slip velocity during grinding can be obtained.

Figures 6A, 6B:
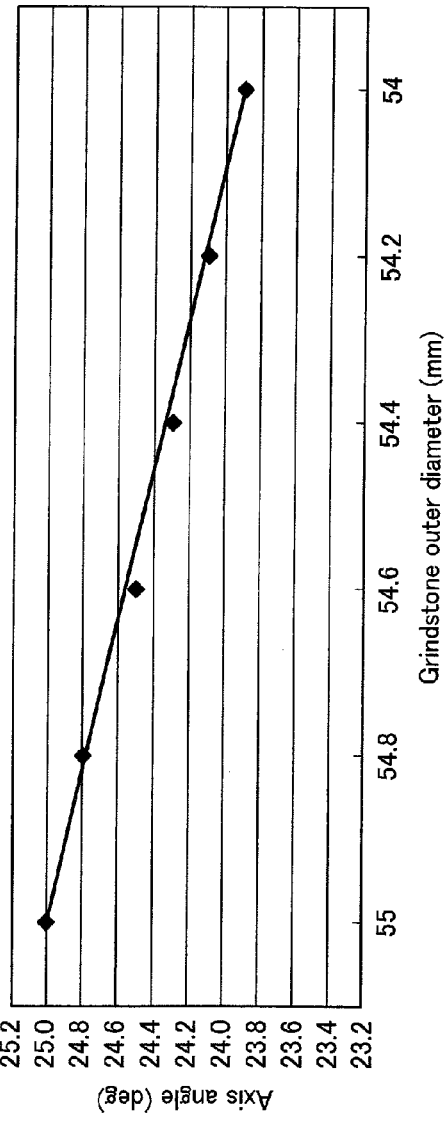

To investigate the respective conditions in response to changes in the outer diameter of the screw-like grindstone, some of the grindstone specifications and the axis angle Σ, the number of grindstone rotations, the number of work rotations, the slip velocity, and the center-to-center distance between the work and the grindstone in association therewith are tabulated, as shown in FIG. 6(a). Also, the relation between the axis angle Σ and the outer diameter of the grindstone has been elucidated, as shown in FIG. 6(b).

As shown in FIGS. 6(a), 6(b), in consideration of the state of contact between the screw-like grindstone and the work, as the outer diameter of the screw-like grindstone is decreased by dressing, the axis angle Σ and the helix angle of the screw-like grindstone during grinding are rendered smaller. To obtain such a helix angle of the screw-like grindstone, it suffices to set the axis angle during dressing at a smaller value, as the outer diameter of the grindstone is decreased, as shown in FIG. 6(b). To render the slip velocity constant, on the other hand, it is advisable to set the number of work rotations and the number of grindstone rotations at larger values. That is, as the axis angle Σ set is decreased, the numbers of rotations of the work and the screw-like grindstone are increased. By this means, the slip velocity of the screw-like grindstone during grinding can be based on the slip velocity of the screw-like grindstone during grinding before dressing. That is, the slip velocity can be maintained constant, and even upon dressing, the grinding properties of the screw-like grindstone can be stabilized.

Other Embodiment

Figure 7:
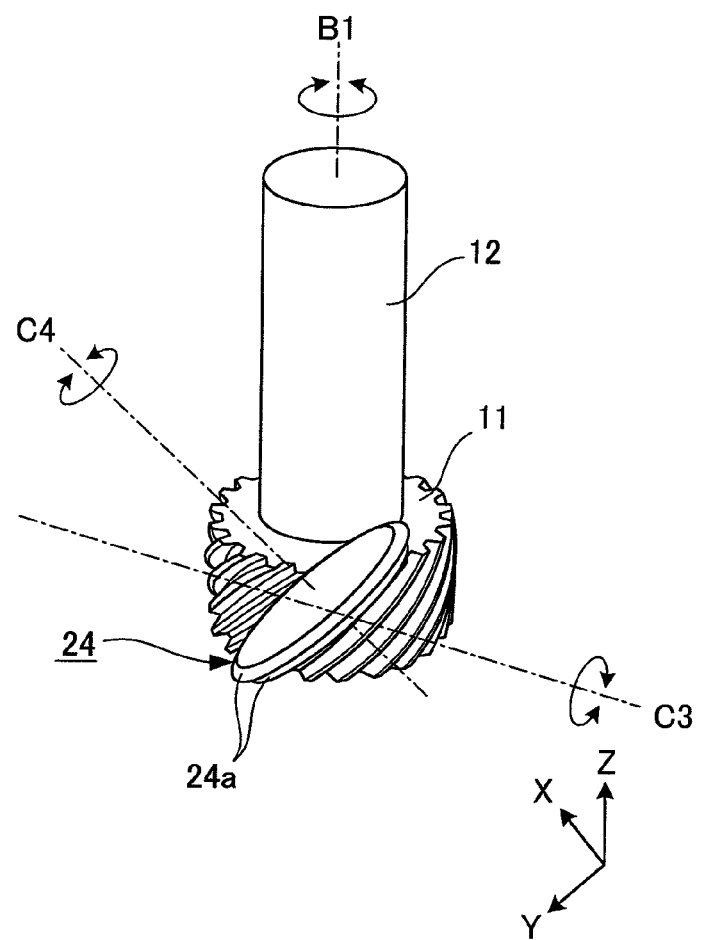
FIG. 7 is a view showing the state of arrangement of the screw-like grindstone and a disk dresser in a dressing apparatus.

In the above-described embodiment, the dressing of the screw-like grindstone 11 with the dressing gear 14 has been explained. As a method for dressing the screw-like grindstone using a dressing tool other than the dressing gear, there is available a method for dressing with a disk dresser of a shape having, as its contours, the sectional shape of a tooth of an internal gear to be machined (i.e., lines of contact with the grindstone). As shown in FIG. 7, a disk dresser 24 disposed at the same angle as the helix angle of the screw-like grindstone 11 so as to engage the screw-like grindstone 11 is rotated about a dresser rotation axis C4 to dress the cutting edge surfaces of the screw-like grindstone 11. Concretely, the screw-like grindstone 11 is rotated about the grindstone rotation axis B1 under a command from the control device while being swung in the Z-axis direction. On the other hand, the screw-like grindstone 11 is moved along the X and Y axes, and also swiveled about a dresser swivel axis C3 disposed at right angles to the disk dresser rotation axis C4, so that the disk dresser 24 will travel along the shapes of the cutting edge surfaces of the screw-like grindstone 11. By this procedure, dressing of the screw-like grindstone 11 is performed. In this case as well, the present invention is applicable. Before dressing of the screw-like grindstone is carried out using the disk dresser, the outer diameter of the screw-like grindstone 11 after dressing is predicted, and the appropriate angle of axis intersection between the screw-like grindstone and the work in grinding after dressing is set by computations based on the predicted value of the outer diameter, by means of the control device of the gear grinding machine. The disk dresser is disposed so as to achieve the shape (helix angle) of the screw-like grindstone conformed to the set angle of axis intersection. In this state, the disk dresser is engaged with the screw-like grindstone 11, whereafter the screw-like grindstone 11 is swung in the Z-axis direction while being rotated about the grindstone rotation axis B1. On the other hand, the screw-like grindstone 11 is moved along the X and Y axes, and the disk dresser 24 is swiveled about the dresser swivel axis C3 so that the disk dresser 24 will travel along the shapes of the cutting edge surfaces of the screw-like grindstone 11. By this procedure, dressing of the screw-like grindstone 11 by the disk dresser 24 is performed. After dressing, the screw-like grindstone is disposed such that the set angle of axis intersection is achieved, and the number of work rotations and the number of grindstone rotations are set so that the same slip velocity as that during grinding before dressing will be obtained. Under these conditions, grinding is carried out.

Because of the above-mentioned features, even when the screw-like grindstone 11 is dressed with the disk dresser 24, the same actions and effects as those in the aforementioned dressing of the screw-like grindstone 11 with the dressing gear 14 are exhibited.

INDUSTRIAL APPLICABILITY

The internal gear machining method, and the method for dressing a tool used therein, according to the present invention, can stabilize grinding properties. Thus, they can be used advantageously in the machine tool industry or the like.

EXPLANATIONS OF LETTERS OR NUMERALS

1 Dressing apparatus
11 Screw-like grindstone
12 Grindstone arbor
13 Control device
14 Dressing gear
21 Screw-like grindstone
24 Disk dresser
M1 Work rotational drive source
M2 Grindstone rotational drive source
W Work
Σ1, Σ2 Axis angle
B1 Grindstone rotation axis
C1 Work rotation axis
C2 Dressing gear rotation axis
C3 Disk dresser swivel axis
C4 Disk dresser rotation axis
V10, V20 Slip velocity
ω11, ω21 Work angular velocity
ω12, ω22 Grindstone angular velocity

The invention claimed is:
1. An internal gear machining method for engaging an internal gear to be machined, which is rotatable about a work rotation axis, with a barrel-shaped screw-like tool, which is rotatable about a tool rotation axis disposed at a redetermined angle of axis intersection with resect to the work rotation axis and synchronously rotating the internal gear to be machined and the screw-like tool in engagement with each other, thereby performing grinding of the internal gear to be machined,
wherein the angle of axis intersection for the grinding is set based on an outer diameter of the screw-like tool after dressing, the outer diameter of the screw-like tool after dressing being predicted before the dressing of the screw-like tool, the dressing of the screw-like tool is performed based on the set angle of axis intersection, and the dressed screw-like tool is disposed at the set angle of axis intersection, wherein the angle of axis intersection is set to be gradually decreased each time the screw-like tool is dressed.

2. An internal gear machining method for engaging an internal gear to be machined, which is rotatable about a work rotation axis, with a barrel-shaped screw-like tool, which is rotatable about a tool rotation axis disposed at a predetermined angle of axis intersection with respect to the work rotation axis, and synchronously rotating the internal gear to be machined and the screw-like tool in engagement with each other, thereby performing grinding of the internal gear to be machined, wherein the angle of axis intersection for the grinding is set based on an outer diameter of the screw-like tool after dressing, the outer diameter of the screw-like tool after dressing being predicted before the dressing of the screw-like tool, the dressing of the screw-like tool is performed based on the set angle of axis intersection, and the dressed screw-like tool is disposed at the set angle of axis intersection, wherein a slip velocity during grinding before dressing is computed, and the number of rotations of the internal gear to be machined and the number of rotations of the screw-like tool are set based on the computed slip velocity.

\* \* \* \* \*